A. J. WEST.
TIRE CHANGER AND CARRIER.
APPLICATION FILED APR. 8, 1921.
1,429,817.
Patented Sept. 19, 1922.
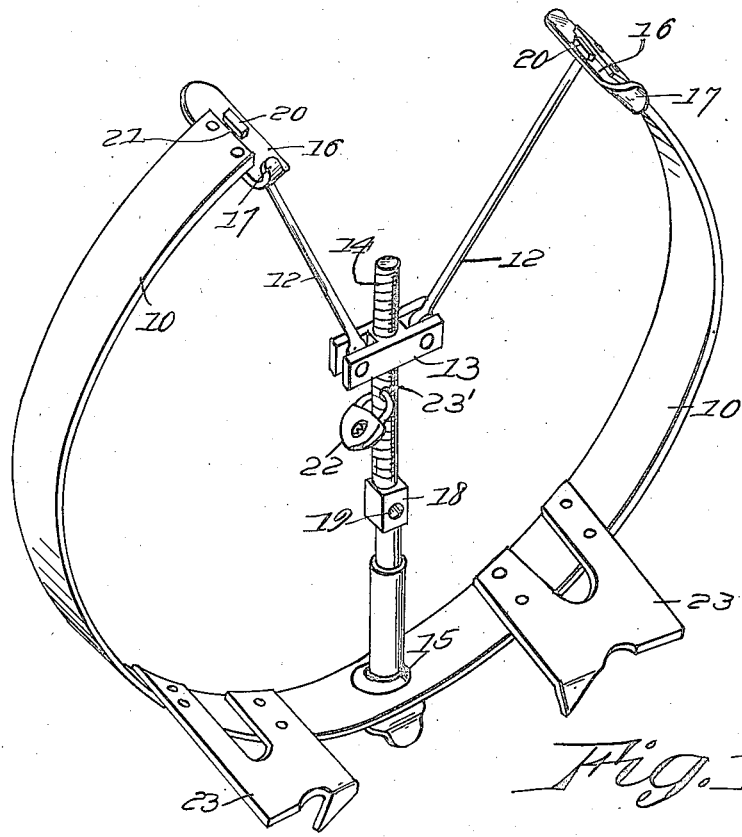
Fig. 1.
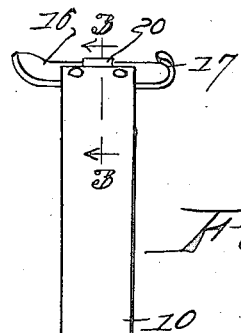
Fig. 2.
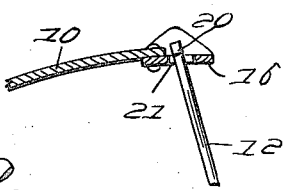
Fig. 3.
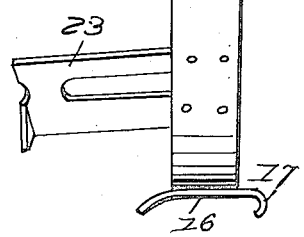
Inventor
A. J. West,
By [signature]
Attorney Patented Sept. 19, 1922.

1,429,817

UNITED STATES PATENT OFFICE.

ANDREW J. WEST, OF ANDREWS, SOUTH CAROLINA.

TIRE CHANGER AND CARRIER.

Application filed April 8, 1921. Serial No. 459,520½.

*To all whom it may concern:*

Be it known that ANDREW J. WEST, a citizen of the United States of America, residing at Andrews, in the county of Georgetown and State of South Carolina, has invented new and useful Improvements in Tire Changers and Carriers, of which the following is a specification.

The object of the invention is to provide a tire rim expanding and contracting implement capable of performing the functions of a tire carrier or holder for preventing the accidental or surreptitious removal of a tire from the vehicle to which the device may be attached for supporting an extra tire; and with these objects in view the invention consists in a construction and combination of parts of which a preferred embodiment is shown in the accompanying drawings, wherein:—

Figure 1 is a perspective view of an implement constructed in accordance with the invention.

Figure 2 is an edge view of the same.

Figure 3 is a detail section on line 3—3 of Figure 2.

The device consists essentially of an expansible resilient band 10 adapted to be snugly fitted into a tire rim and approximating a circle in extent, said band, however, being split with its terminals separated and connected by radial elements 12 with a follower 13 consisting of a nut with which is engaged a bolt 14 also disposed radially of the band and having a swivel connection at 15 therewith, to the end that when the feed screw is turned in one direction to produce inward movement of the follower nut the radial elements 12 and 14 are placed under tensile strain and the band is contracted, whereas when the bolt is turned to move the follower in the opposite direction or outwardly said radial elements are subjected to strain in the opposite direction and the band is expanded.

The band exteriorly carries rim seats or clips 16 adapted for engagement with a rim to impart either contractive or expansive strain thereto as by having lips 17 which overlap the outer surface of the rim, and the bolt is provided with wrench seats 18 and 19 consisting respectively of a squared or cross sectionally angular portion suitable for a nut wrench, and a transverse opening suitable for a bar wrench or pin.

The follower, consisting as above noted of a nut, is carried by the band actuating elements 12 which preferably consist of rods of which the extremities are headed as at 20 and engaged with openings 21 in the band.

Obviously by seating a tire rim in the clips it is only necessary to turn the operating bolt in order to either expand or contract the rim as may be desired; and when fully expanded the follower may be locked in its adjusted relation with the bolt by the use, for example, of a padlock 22 engaged with the seat consisting of a transverse opening 23' in the bolt, so that said padlock is in the path of inward movement of the follower to prevent the contraction of the band and hence the release of the rim and tire from the device so that the latter is adapted to constitute a carrier or extra tire holder, to which end it is provided with brackets 23 for attachment to the vehicle.

Having described the invention, what is claimed as new and useful is:—

1. A device for the purpose indicated comprising an expansible split band provided with means for attaching the same to a vehicle body, clips constituting ring seats mounted respectively at the extremities of the band and on the outer face of the latter opposite the split portion, radial elements having their extremities pivotally connected with the clips at the extremities of the band, and means for imparting both tensile and strut strains to said radial elements, the clips being formed with inturned lips to overlap the outer surface of the rim to provide contractile strain on the latter in the event that locking of the rim is to be secured by that means rather than by expansible force imparted to the band.

2. A device for the purpose indicated comprising an expansible split band, brackets connected to the same and adapted to be attached to a vehicle body, said brackets being disposed in spaced relation and opposite the splitting or open portion of the band, a radially disposed feed screw having a swivel connection with the band at a point intermediate between the brackets and on the inner face of the band, a follower threadingly engaged with the feed screw, clips constituting rim seats mounted respectively at the extremities of the band and on the outer face of the latter below the swivel connection of the feed screw, radial elements having their extremities respectively pivotally connected with the follower and with the clips at the extremities of the band, and a lock engageable with an aperture in the feed screw to prevent inward movement of the follower and hence a contractile strain on the band, the clips being formed with inturned lips to overlap the outer surface of the rim to provide contractile strain on the latter in the event that locking of the rim is to be secured by that means rather than by expansible force imparted to the band.

In testimony whereof he affixes his signature.

ANDREW J. WEST.